Dec. 9, 1941. A. E. COLE 2,265,348
ICE TRAY AND GRID
Filed March 16, 1939 2 Sheets-Sheet 1
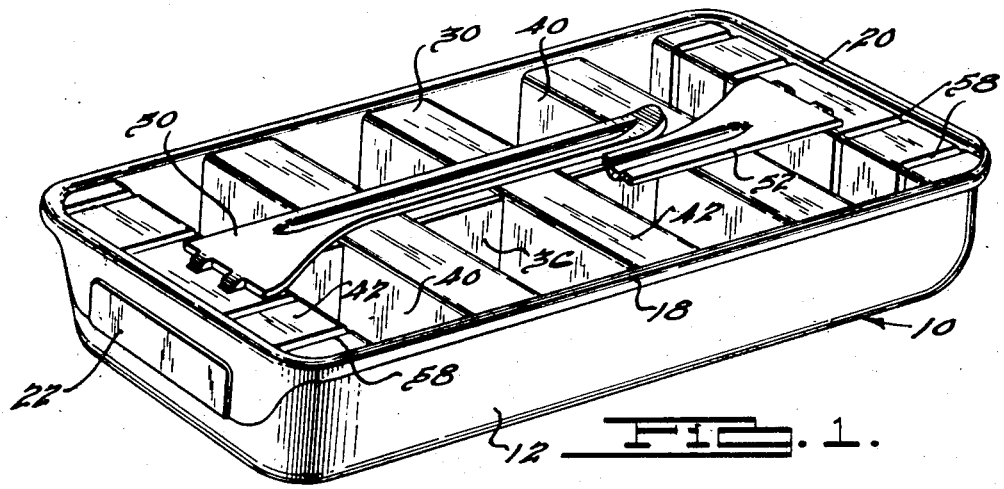
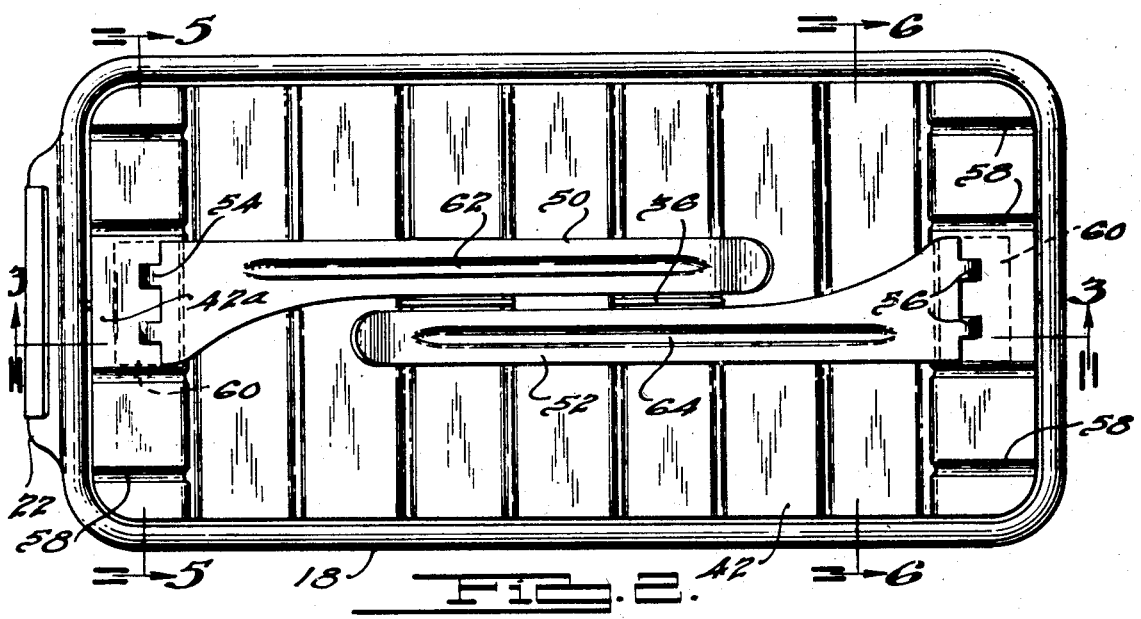
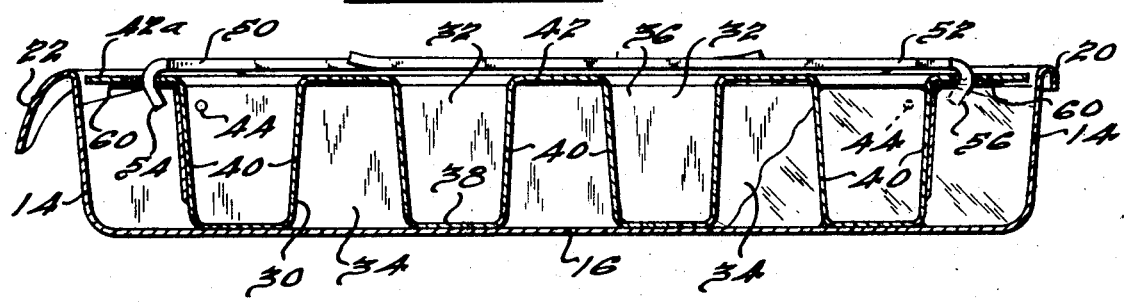
INVENTOR
Arthur E. Cole.
BY Dike, Calver & Gray
ATTORNEYS Dec. 9, 1941.     A. E. COLE     2,265,348
ICE TRAY AND GRID
Filed March 16, 1939     2 Sheets-Sheet 2

INVENTOR
Arthur E. Cole.
BY Pike Calver & Gray
ATTORNEYS.

Patented Dec. 9, 1941

2,265,348

UNITED STATES PATENT OFFICE 2,265,348

ICE TRAY AND GRID

Arthur E. Cole, Detroit, Mich.

Application March 16, 1939, Serial No. 262,119

3 Claims. (Cl. 62—108.5)

This invention relates to refrigerators or ice forming machines, and more particularly to ice trays having removable and replaceable grids designed to facilitate the production and removal of individual ice blocks from the machine and tray.

Heretofore ice trays have been formed with removable grids, however considerably difficulty has been experienced in effecting removal of the grid and the frozen contents from the pan, particularly because of the fact that as the liquid contents of the tray solidifies to form ice, it expands thereby forcing the ice into firm contact with the surfaces of the grid and pan. It has been common practice to heat the surface of the pan, grid and ice as by the application of hot water to melt a portion of the ice, whereupon the bond between the frozen contents of the pan and grid would be broken so that the ice might be removed. This practice is objectionable as it is time consuming and wasteful of ice or other frozen contents of the pan and grid. Efforts have also been made to effect the removal of the frozen substance by mechanical means as by cam or lever mechanism operable on the tray and grid. This expedient has been undesirable because of the complexity and cost of the actuating mechanism, and also because of the fact that such mechanism could not be quickly and easily actuated to effect removal of the frozen contents from the pan and grid.

An object of this invention is therefore to provide a simple and inexpensive ice tray unit including a grid which may be easily actuated to effect removal of the frozen contents therefrom.

A further object of the invention is to provide a flexible grid member proportioned in such a manner as to utilize the space within the pan to the greatest advantages and to facilitate the removal of the frozen contents therefrom.

Another object resides in the provision of a novel longitudinally flexible grid member having means associated therewith to flex the grid to facilitate the removal of the frozen contents from the grid and pan of the tray assembly.

Yet a further object of the invention is to provide a pan and grid assembly wherein the latter comprises a longitudinally flexible grid member and a separator member extending through the side walls of the grid member, the construction being such that the grid member may be flexed relatively to the separator member to extract the ice blocks.

A still further object is to provide a novel ice tray assembly including a flexible grid member having manually operable means to flex the grid member to permit the removal of any desired quantity of ice.

Other objects and advantages of this invention will be apparent from the following description and claims considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Fig. 1 is a perspective view, partly in section, of a device embodying the present invention;

Fig. 2 is a plan view of the device illustrated in Fig. 1;

Fig. 3 is a sectional view taken substantially on the line 3—3 of Fig. 2;

Figure 5:
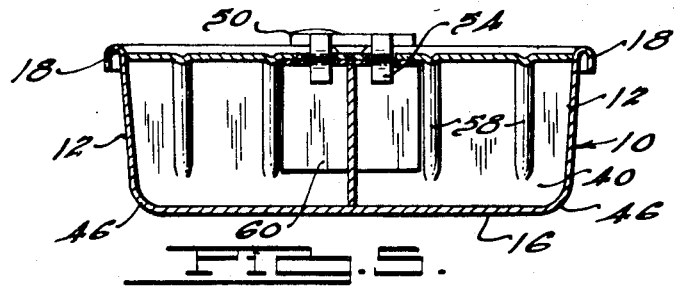
Fig. 5 is a sectional view taken substantially on the line 5—5 of Fig. 2.
Figure 6:
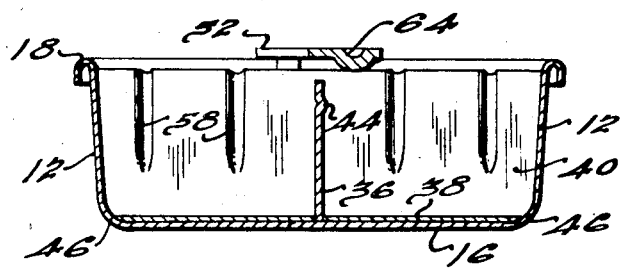
Fig. 6 is also a section view taken substantially on the line 6—6 of Fig. 2.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, which illustrate by way of example, one desirable form of the invention, a tray or pan is designated as a whole by the reference numeral 10. The pan 10 having side and end walls 12 and 14 respectively and a bottom wall 16 is preferably generally rectangular in shape and may be formed in any desired manner as by a stamping operation wherein suitable draw dies are utilized. The side and end walls 12 and 14 are tapered or inclined upwardly and outwardly with reference to the bottom wall 16, and are connected thereto by a curved section 46, to permit removal of the forming dies, and also to facilitate the removal of the frozen contents such as ice blocks from the pan 10 when in use.

The upper edges of the side and end walls 12 and 14 respectively of the pan 10 are preferably flanged outwardly and downwardly as illustrated at 18 and 20 respectively to stiffen the pan against transverse bending, and also to present rounded surfaces thereby minimizing the possibility of injuring the hands of persons manipulating the tray. One end of the pan may be formed with an extended flange 22 by which the pan may be grasped to remove it from a freezing compartment of a refrigerator or ice forming machine.

A grid 30 formed of flexible metal or other suitable material may be placed in the pan 10 to divide the space within the pan into a plurality of ice block spaces of suitable size. The grid 30 is preferably formed of a single piece of metal deformed in any suitable manner as by a stamping operation to form a plurality of oppositely directed spaces of generally rectangular or trapezoidal shape, such for example as the upwardly directed spaces 32 and the downwardly directed spaces 34.

The ice block spaces 32 and 34 formed by the grid 30 within the pan 10 may be divided laterally of the pan to form ice blocks of suitable length by means of separator means in the form of a flat metal strip 36 extending longitudinally through the grid member 30 within the pan 10. Any desired number of separator means 36 extending longitudinally of the pan through the grid 30 may be provided within the pan 10. The grid member 30 may be slotted vertically to receive the separator 36, the slots extending through the walls 38 and 40, which forms the bottom and side walls of the upwardly directed spaces 32, and extending to the upper walls 42 of the portions of the grid defining the top of the downwardly directed spaces 34.

Figure 4:
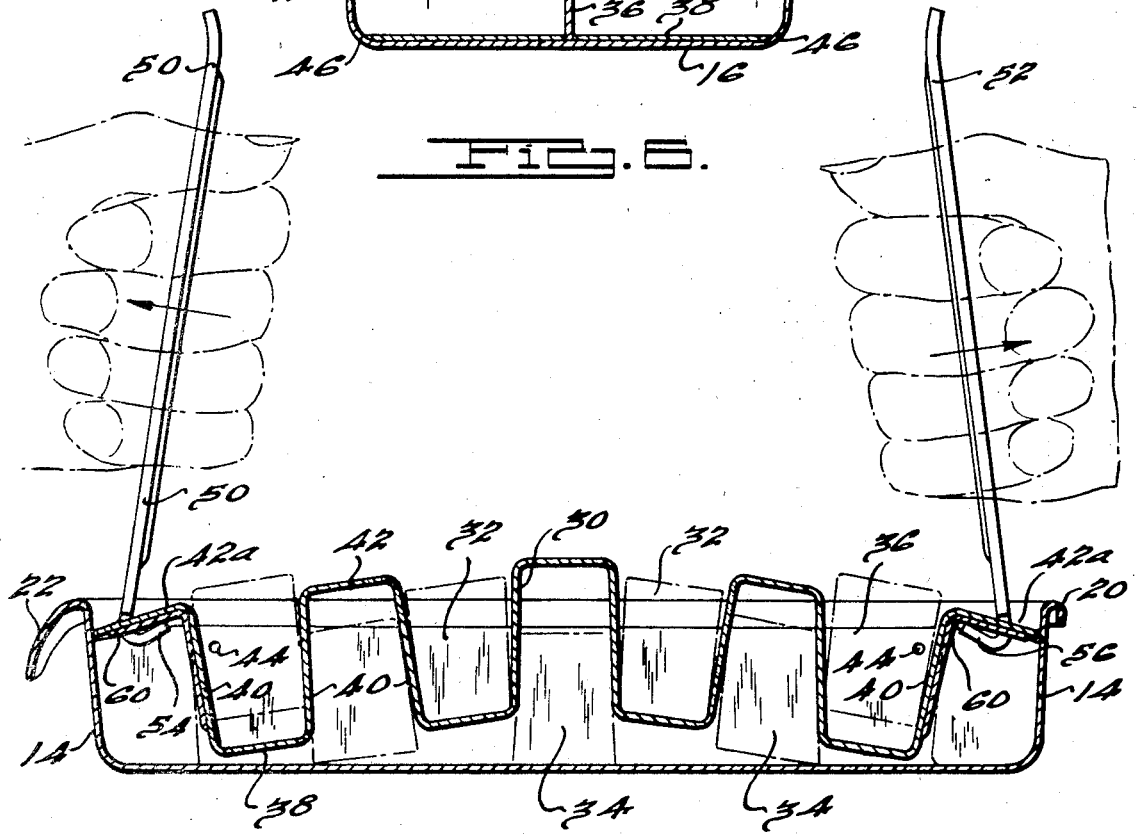
Fig. 4 is a view similar to Fig. 3 showing the grid member in a flexed position to facilitate removal of the frozen contents from the pan and grid.

The lower edge of the separator 36 engages the bottom of the pan 10, and in addition to separating the ice blocks transversely of the pan and grid, also serves as a heat transfer medium to insure more rapid freezing of the liquid contents of the pan and grid. The separator 36 may be held in assembled relation relative to the grid 30 by means of a plurality of indentations 44 formed therein. These indentations 44 are of sufficient depth to prevent the separator 36 from escaping from the slot formed in the grid 30, and are so spaced as illustrated in Figs. 3 and 4 to prevent undesirable longitudinal movement relative to the grid.

The edges of the side walls 40 of the grid 30 which lie adjacent the side walls 12 of the pan 10 are tapered or inclined angularly relative to the lower and upper walls 38 and 42 to lie adjacent the side walls 12 of the pan when the grid 30 is in position in the pan. The lower edges of the side walls 40 and the lower walls 38 of the grid 30 are also rounded or cut away so as to conform to the rounding of the section 46 interconnecting the side walls 12 with the bottom 16 of the pan.

The pan, grid and separator may of course be formed of any desired metal, however it has been found that excellent results are obtained when they are formed of aluminum and are anodically treated and sealed by applying a substance having greasy or oily properties such for example as paraffin or wax to their surface. During the sealing operation the sealing medium such as paraffin or wax is drawn into the anodized surface of the grid, tray and separator by capillary attraction and thereafter presents a very smooth surface which prevents the liquid from seeping thereinto during the freezing operation. The ice or other frozen contents of the pan and grid may be readily removed therefrom by a slight flexing of the grid 30.

Manually operable means are provided to flex the grid 30 to effect removal of the ice or other frozen contents from the grid and pan. A pair of oppositely disposed nested levers 50 and 52 are provided with bifurcated hook extensions 54 and 56 respectively which project through apertures formed in the upper wall sections 42 adjacent each end 14 of the pan 10, and straddle the upper edge of the separator 36. The handles of the levers 50 and 52 may be overlapped in nested relation as illustrated in Fig. 2.

The upper wall sections 42 of the grid which receive the levers 50 and 52 may be strengthened by means of reinforcing webs 58 formed therein. These reinforcing grooves 58 may extend down the side walls 40 adjacent the wall sections 42 which receive the levers 50 and 52. If desired these sections may be further strengthened and reinforced by means of reinforcing segments 60 spot welded or otherwise suitably secured to the sections subjected to critical stresses, such for example as those provided with the reinforcing webs 58.

The operation of this device is as follows: The grid 30 and separator 36 are placed in the pan 10, and water or other substance to be frozen is poured in the pan filling the upwardly and downwardly directed spaces 32 and 34 to any desired level. The tray is then placed in the freezing compartment of a refrigerator or ice forming device and allowed to remain a sufficient period of time to freeze or solidify the contents of the tray. When it is desired to extract the frozen contents from the tray, the flange 22 which forms a handle is grasped and the tray lifted out of the freezing compartment. The bond between the bottom of the pan 10 and the freezing compartment may easily be broken because of the fact that the sealed surface of the bottom of the pan repels moisture to such an extent that no material bond is produced between the tray and the supporting surface of the compartment. If desired the bottom of the tray may be flanged downwardly to provide supporting ribs, or a plurality of indentations may be formed therein to provide line or point contact with the supporting surface of the freezing compartment.

After the tray is removed from the freezing compartment, it may be set on any suitable surface. The levers 50 and 52 which may also be formed of any desired material, such for example as anodized and sealed aluminum, are provided with downwardly extending flanges 62 and 64 respectively which rest on the upper walls 42 of the grid 30 to permit line contact only between the levers and the upper surface of the grid. The levers 50 and 52 may be grasped and rotated about their connections with the upper wall sections 42 of the grid 30 to which they are attached to flex the grid as illustrated in Fig. 4. The ice blocks in the upwardly directed spaces 32 may then be picked out for use with interfering with those in the downwardly directed spaces 34. If all of the ice in the tray is desired for use at one time, the grid 30 may be removed from the pan leaving the ice blocks below the grid in the pan.

During the flexing operation of the grid 30, it will be observed that the ends of the hooks 54 and 56 exert a bending force on the upper wall sections 42a, bending downward the ends thereof and bending or bowing upwardly the midportion of the grid, thereby breaking the contact between the pan and the ice blocks. This contact is of course easily broken because of the fact that all of the ice contacting surfaces are sealed as pointed out above. After the contact between the ice grid and the pan has been broken, the flexing of the grid breaks the contact between the ice or other frozen contents and the grid. As the grid approaches the position illustrated in Fig. 4, the outer edges of the wall sections 42 may engage the upper edge of the separator 36 to support the sections of the end which are subjected to bending forces to flex the grid to effect removal of the ice or other frozen contents.

I claim:

1. An ice block forming device for use in an ice tray pan comprising a flexible metal grid formed to provide a plurality of generally rectangular shaped ice block spaces alternately opening upwardly and downwardly, the upright edges of the grid being inclined upwardly and outwardly from the bottom and having rounded corners at the juncture between the bottom of the grid and the side walls, generally vertically disposed separator means, the grid being slotted below the substantially flat upper walls to receive the separator means, means to prevent separation of the separator means and grid, manually operable means to flex the grid relative to the separator member comprising levers having handles mounted in the midsection of the grid at opposite ends thereof, the handles of the levers being offset to nest in a generally horizontal position above the grid and having centrally disposed longitudinally extending indentations to engage the substantially flat upper walls in line contact to support the levers in the inoperative position.

2. A unitary grid for an ice tray pan comprising longitudinally slotted side and bottom walls and unslotted upper walls interconnected to form generally rectangularly shaped upwardly and downwardly opening ice block compartments, a longitudinally extending separator member positioned in the slotted portions of the side and bottom walls to divide the space within the pan into a plurality of transversely spaced ice block compartments, and locking means carried by the separator to engage the side and bottom walls forming a pair of spaced upwardly opening ice block compartments to maintain the grid in assembled relation.

3. An ice block forming device comprising a pan having a bottom wall and upwardly and outwardly inclined side walls, the pan having inwardly curved corners at the junctures of the side and bottom walls, a unitary flexible metal grid having longitudinally slotted side and bottom walls interconnected by upper unslotted walls to form generally rectangularly shaped upwardly and downwardly opening ice block spaces, the upright edges of the grid being inclined substantially in accordance with the inclination of the side walls of the pan and the bottom walls of the grid being contoured inwardly to clear the curved corners of the pan, a longitudinally extending separator member positioned in the slotted portions of the grid to divide the space within the pan into a plurality of transversely spaced ice block spaces, and means to flex the grid comprising levers hingedly mounted centrally in the unslotted upper walls of the grid at opposite ends thereof, the levers having handle portions offset to nest in a generally horizontal position above the upper walls and having longitudinally extending indentations to engage the upper grid walls in line contact to support the handles in an inoperative position.

ARTHUR E. COLE.